United States Patent [19]

Sakurai

[11] Patent Number: 5,158,252
[45] Date of Patent: Oct. 27, 1992

[54] THREE-POSITION VARIABLE CAMBER KRUEGER LEADING EDGE FLAP

[75] Inventor: Seiya Sakurai, Seattle, Wash.

[73] Assignee: The Boeing Company, Seattle, Wash.

[21] Appl. No.: 782,525

[22] Filed: Oct. 24, 1991

[51] Int. Cl.⁵ ............................................. B64C 3/50
[52] U.S. Cl. .................................. 244/214; 244/213; 244/219
[58] Field of Search ................ 244/210, 213, 214, 219

[56] References Cited

U.S. PATENT DOCUMENTS

| | | | |
|---|---|---|---|
| 3,504,870 | 4/1970 | Cole et al. | 244/214 |
| 3,556,439 | 1/1971 | Autry et al. | 244/214 |
| 3,743,219 | 7/1973 | Gorges | 244/214 |
| 3,910,530 | 10/1975 | James et al. | 244/214 |
| 3,917,192 | 11/1975 | Alvarez-Calderon | 244/214 |
| 3,941,334 | 3/1976 | Cole | 244/214 |
| 3,994,451 | 11/1976 | Cole | 244/219 |
| 4,189,120 | 2/1980 | Wang | 244/214 |
| 4,189,121 | 2/1980 | Harper et al. | 244/214 |
| 4,262,868 | 4/1981 | Dean | 244/214 |
| 4,351,502 | 9/1982 | Statkus | 244/219 |

FOREIGN PATENT DOCUMENTS 2101536 9/1972 Fed. Rep. of Germany .

Primary Examiner—Joseph F. Peters, Jr.
Assistant Examiner—Anne E. Bidwell
Attorney, Agent, or Firm—Hughes & Multer

[57] ABSTRACT

A variable camber flap assembly having first and second operative positions. A rotatable drive arm powers first and second linkage subassemblies. The first linkage subassembly extends the flap panel in a downward and forward direction to its operative positions, and also rotates a hinged bullnose outwardly so as to foreshorten the distance between the leading and trailing edges of the flexible flap panel, increasing the camber of the flap. The second linkage subassembly cooperates with the first to angularly orientate the flap panel in its operative positions, and also positions the trailing edge of the panel relative to the leading edge of the airfoil. In the first operative position the trailing edge of the panel is spaced forwardly from the leading edge of the airfoil so as to form an aerodynamic slot; in the second operative position the flap panel is drawn rearwardly so that its trailing edge forms an aerodynamic seal with the airfoil.

14 Claims, 12 Drawing Sheets

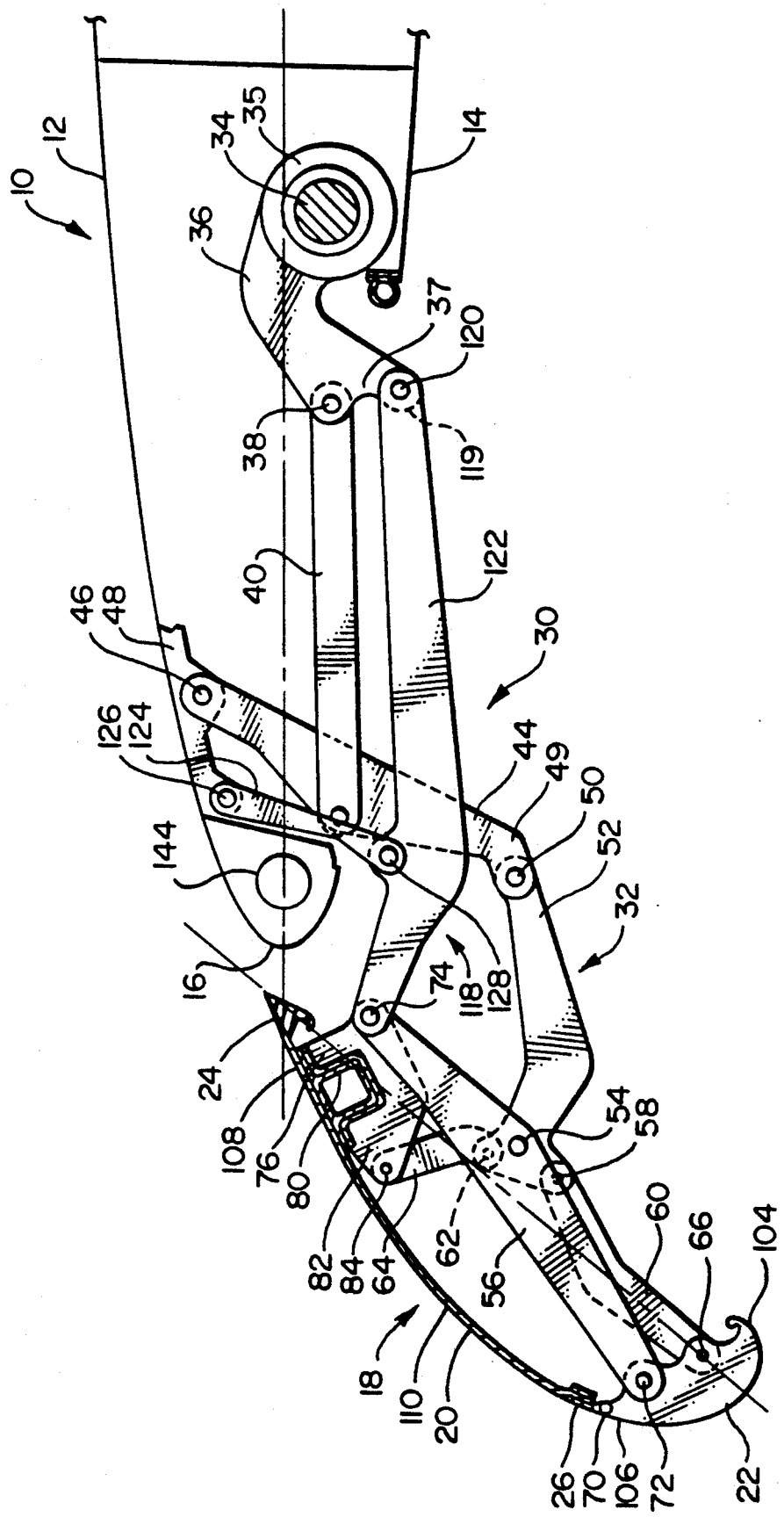

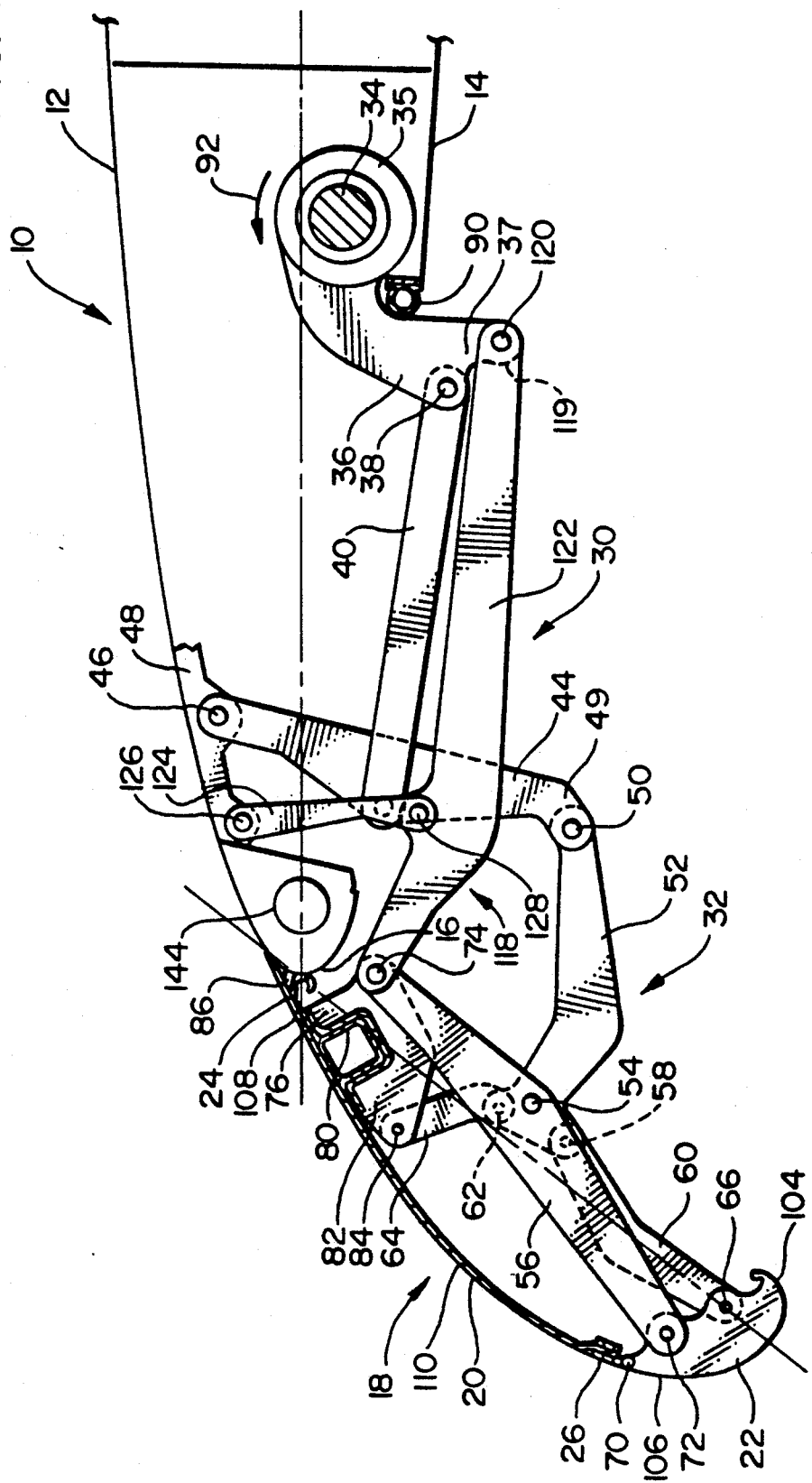

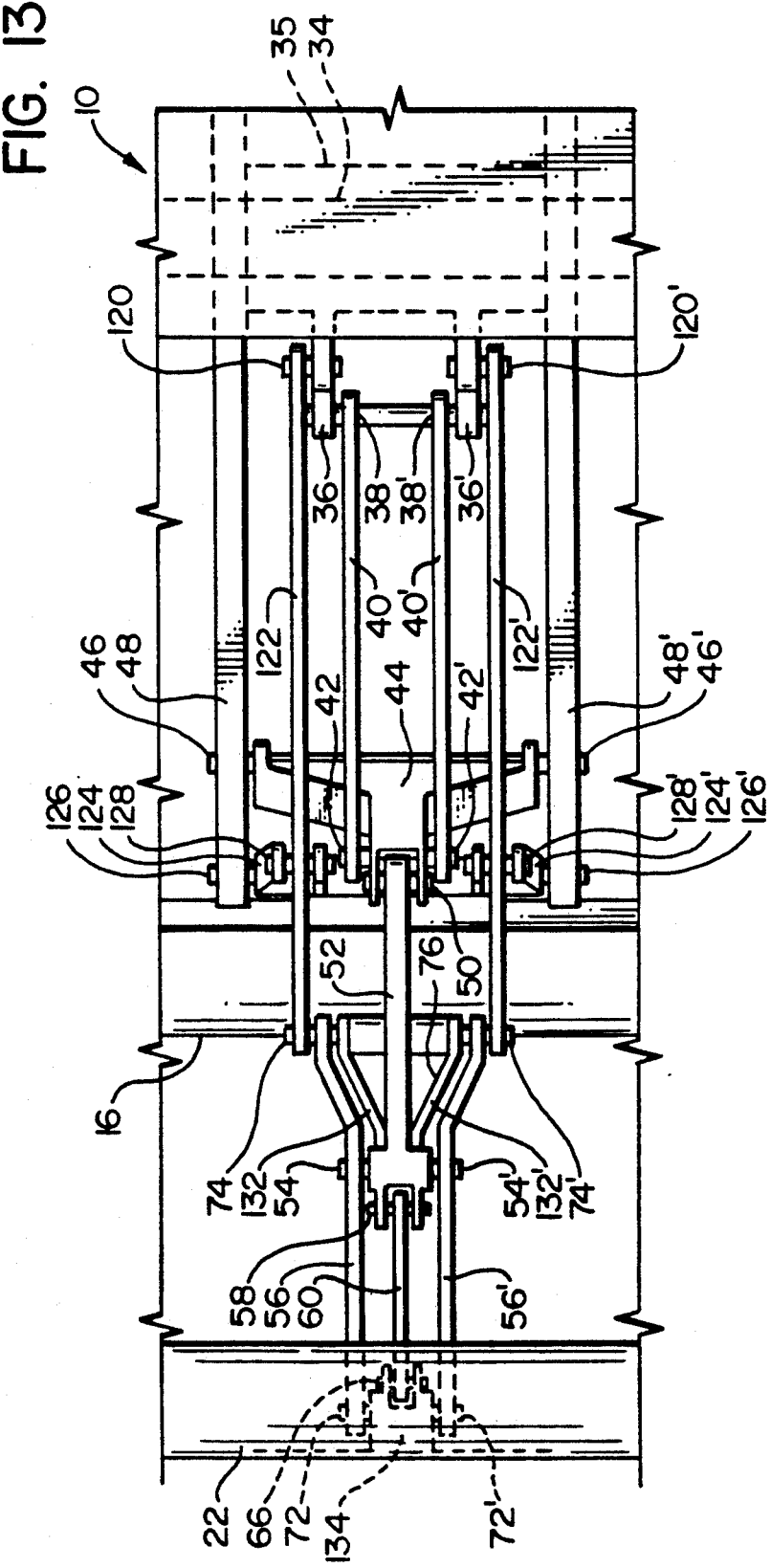

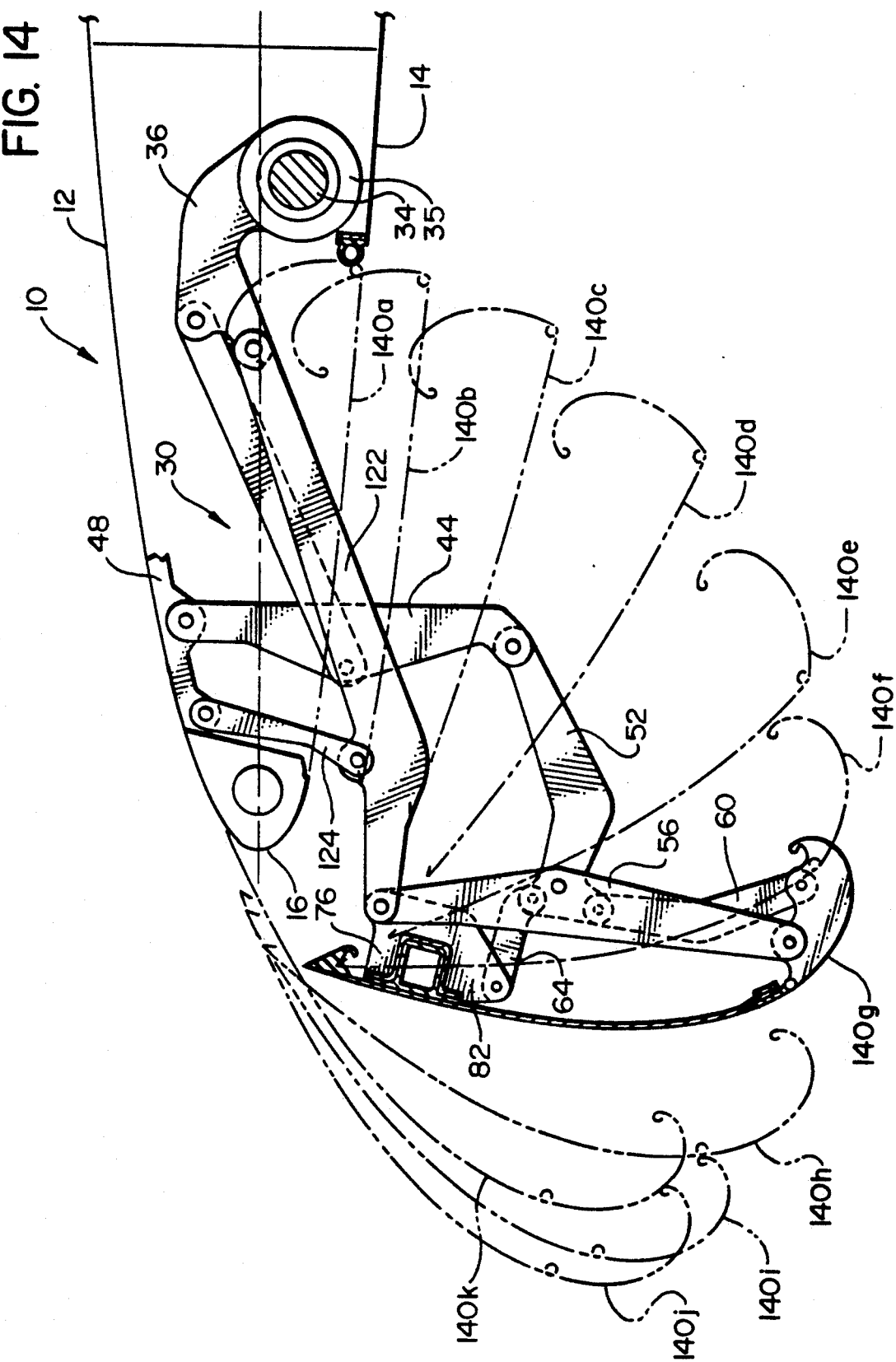

THREE-POSITION VARIABLE CAMBER KRUEGER LEADING EDGE FLAP

TECHNICAL FIELD OF THE INVENTION

The present invention relates to a high lift leading edge flap for the wing of an aircraft, and more particularly to a variable camber Krueger leading edge flap having a first, stowed position for high speed cruise operation, a second, forwardly extending position in which the forward edge of the flap forms an aerodynamic slot with the leading edge of the wing for aircraft landing, and a third, also forwardly extending position in which the aerodynamic slot is sealed, and the flap angle of deflection decreased, for aircraft takeoff.

BACKGROUND OF THE INVENTION

Leading edge flaps, such as variable camber Krueger (VCK) flap systems, are an attractive means of low speed stall protection on modern aircraft due to their relative simplicity and low weight. In order to meet the specific aerodynamic requirements of new high speed wing designs which have evolved in recent years, it is necessary that the flap produce good lift coefficients for both landing and take-off operations. For example, unlike most prior generation aircraft, in which the take-off position was not critical, the wings proposed for many aircraft under development will be critical in all flying conditions; consequently, for these new aircraft to obtain the desired performance, the leading edge flap system must provide (a) high lift coefficients with minimum drag for take-off, (b) the highest possible lift coefficient for the slowest possible landing, and (c) a small radius leading edge and minimum drag for efficient cruise. For a VCK-type leading edge flap system to provide these characteristics, it must (a) be configured with sealed, or near sealed, trailing edges for takeoff, (b) be configured to provide a sufficiently large trailing edge slot for landing, and (c) be stowed with a sufficiently small radius leading edge for cruise.

A number of VCK flap systems and other devices have been proposed for changing the camber of an airfoil to improve low speed handling, while preserving suitable cruise characteristics. For example, a VCK leading edge flap has been incorporated in the Boeing 747-type airplane, and a number of flaps of this and similar types are shown in the patent literature, examples of these being given below.

U.S. Pat. No. 4,262,868 (Dean) shows a VCK flap which has the three operating positions discussed above. This device utilizes a three-point support for the variable camber flap surface, The trailing edge of the flap is supported off the wing by a small bell crank 33 which is connected to a chordwise extending beam 24; the rearward end of this beam is connected to the rear edge of the flap panel and the forward end is pivotally connected to the leading edge. The middle portion of the panel is supported from the central portion of the beam by a linkage. The beam is connected to the lower arm of a drive crank, the upper arm of which is connected to the support hell crank mentioned above. The drive crank extends the flap forwardly, and as this is done, links 16c and 37 push the middle portion of the flap panel outwardly to give it more camber. A separate bullnose 12 also rotates into position against the leading edge of the flap panel for take-off and landing.

While the Dean system may be suitable for many applications, it exhibits drawbacks in terms of cost, weight and efficiency. First, because the device employs only a relatively simple pivoting motion (primarily about points 34, 17, and 15) to move between its deployed positions, it is not possible for it to provide the ideal positioning and angular orientation of the flap in each of these locations: in the landing position the panel should be relatively steeply angled to the airflow and have its trailing edge positioned forward of the leading edge of the wing to form the aerodynamic slot, while in the take-off position the panel should be more shallowly angled and have its trailing edge moved more or less directly rearwardly to the leading edge of the wing to form the aerodynamic seal. However, the Dean linkage cannot provide the motions necessary to do this, and so the flap's actual location and angulation in these positions represents a less than ideal compromise. Also, the Dean system utilizes three separate supports along the flap panel, as well as an additional support for the separate bullnose, and each of these is expensive to fabricate and adds weight. Furthermore, because the bullnose piece is separate from the flap panel, an aerodynamically inefficient discontinuity is created between these during deployment. Still further, because the support bell crank 33 is positioned quite close to the leading edge of the wing, this interferes with the normal installation of anti-icing ducting in this area.

U.S. Pat. No. 3,743,219 (Gorges) shows another 3-position VCK flap system. In this case, the rear edge of the flap panel is connected directly by a link 64 to a bell crank 60, link 64 being suspended from the wing by a rocker arm 74. A pair of links connected to the other arm of the bell crank form a scissors arrangement which foreshortens the distance between the leading and trailing edges of the flap so as to bow the flap outwardly to the desired camber. The skin thickness of the flap is tapered, and this determines the proper amount of camber when flexed and also the position at which the greatest amount of camber occurs. While this arrangement has the advantage of being simple, it, like the Dean linkage, is unable to generate the required motions to ideally locate and orientate the flap in its two operative positions. Furthermore, because it relies on the memory of the panel material to achieve the desired camber, and also provides only one point support for the bullnose, the cambered flap is subject to instability due to aerodynamic forces. Still further, since the rigid bullnose cannot bend back upon itself, it is difficult to stow compactly.

U.S. Pat. No. 3,504,870 (Cole, et al. '870) shows another VCK flap system having a stowed position under the wing and a high lift landing position in which a slot is formed with the leading edge of the Wing. However, this device does not have the third position in which the trailing edge of the flap forms a seal with the wing for take-off. The linkage utilizes three separate support locations along the flap panel, and a separate bullnose piece, and so shares disadvantages with the Dean system. The rear edge of the flap panel is connected to a link 24 which is moved forwardly and rearwardly by the middle portion of a crank arm 16. The lower end of the crank arm is connected to a link 28 which acts through another link 39 to rotate the bullnose, and this also acts through a link 32 to move the middle portion of the flap panel outwardly to increase its camber.

The following patents share generally the disadvantages of the devices discussed above, notably the inability to achieve an ideal angulation and positioning of the flap for both landing and take-off.

U.S. Pat. No. 3,941,334 (Cole '334) is directed to a variable camber airfoil where the camber of the leading edge can be changed to increase or decrease lift. This incorporates a flap assembly which is generally similar to that shown by Cole et al. '870. U.S. Pat. No. 3,904,451 (Cole '451) discloses essentially the same apparatus as Cole '334.

U.S. Pat. No. 3,910,530 (James, et al.) shows another leading edge flap which is moved between stowed and deployed positions by means of a linkage having an arm 56 which is actuated by bell crank. At an intermediate pivot location 60, the arm 56 has a direct connection to the flap, by which it moves the flap to and from its deployed position. An outer pivot connection 88 of arm 56 acts through a link 86 to deploy a separate bullnose.

U.S. Pat. No 3,556,439 (Autry, et al.) shows a triple flap leading edge device which has two pivoting portions (leading edge flaps 19, 20), plus a bullnose 21. In the landing position, both of the flap sections are rotated outwardly, with the forward of these extending forward of the other to form a slot. In the take-off configuration, one section rotates outwardly to the deployed position, and the other remains stowed within this.

U.S. Pat. No. 4,189,120 (Wang) shows a variable camber leading edge flap which is deployed by means of two links 30 and 36, this being similar in overall configuration to that shown in Cole et al. '870.

U.S. Pat. No. 4,189,121 (Harper, et al.) shows what is called a "variable twist leading edge flap". The flap extends downwardly and forwardly to its deployed position, and there is linkage which deploys a separate bullnose.

The following patents are of background interest only:

U.S. Pat. 4,351,502 (Statkus) shows a variable camber leading edge device for an airfoil, and does not involve a separately deployable flap.

U.S. Pat. No. 3,917,192 (Alvarez-Calderon) shows a mechanism having two separate flap members that deploy to form a double slotted arrangement.

German Patent No. 2,101,536 (Erelefeldt) shows a scissors type linkage which deploys a leading edge flap, this apparently being stowed against the outward surface of the wing for cruise.

Accordingly, there exists a need for a three-position variable camber Kreuger flap system having a linkage which will enable the deployed flap to move to first and second operative positions wherein the flap is ideally positioned and angulated for landing and take-off operations. Furthermore, there exists a need for such a system which provides the deployed, highly-cambered flap with sufficient support to impart stability thereto during such flight operations. Still further, there exists a need for such a system which is economical to manufacture and suitably low in weight, and Which can be mounted to the forward portion of an airplane wing without interfering with the installation of anti-icing ducting in this area.

SUMMARY OF THE INVENTION

The present invention has solved the problems cited above, and comprises generally a linkage mechanism for extending a flap from a stowed position within the undersurface of an airfoil to forwardly extended operating positions. This linkage mechanism is made up of first and second subassemblies. The first subassembly has a drive arm portion which is mounted to the airfoil for rotation in a chordwise plane. The rearward end of a drive link is mounted to this drive arm portion, and a forward end of this is pivotally connected to a middle portion of the flap, so that in response to rotation of the drive arm the link extends the flap downwardly and forwardly to its operative positions. A support arm supports the drive link for extension relative to the airfoil, this having an upper end which is pivotally mounted to the fixed structure of the airfoil and a lower end pivotally mounted to the drive link. Preferably, the lower end of the support arm may extend downwardly beyond the forward end of the drive link; a connecting link is mounted to the lower end of the support arm, and a forward end of this is pivotally mounted to the middle portion of the flap, so that this provides the connection between the drive link and the flap.

The second linkage subassembly has a second drive arm portion which is mounted for rotation coaxially with the first, and the rearward end of a second drive link is mounted to this, its forward end being pivotally connected to a trailing edge portion of the flap so that in response to rotation of the second drive arm portion the second drive link extends the trailing edge of the flap to predetermined locations in the operative positions. A second support arm supports the second drive link for extension relative to the airfoil, this also having an upper end which is pivotally mounted to the fixed structure of the airfoil and a lower end pivotally mounted to the drive link.

A variable camber flap assembly is provided having a linkage arranged and actuated in a chordwise plane for extending the flap to first and second forward operative positions from a stowed position within the undersurface of the airfoil, the first operative position being configured for landing, and the second for takeoff. The assembly may comprise a flexible flap panel, With a bullnose member being pivotally mounted to a leading edge of this. The first end of a flap chord beam is pivotally mounted to the bullnose member, and the second end of the beam is mounted to the trailing edge portion of the flap panel. A drive arm is mounted to the fixed structure of the airfoil for rotation in a chordwise plane, and this has first and second angularly spaced apart pivot connections.

First and second linkage subassemblies operatively interconnect the drive arm pivot connections with the flap panel. The first subassembly comprises (1) means for extending the flap panel in a downward and forward direction from the stowed position to the operative positions, and (2) means for rotating the bullnose member outwardly about the end of the flap chord beam as the flap panel extends to its operative positions, so that this foreshortens the distance between the trailing and leading edges of the flap and so increases its camber. The second linkage subassembly comprises, (1) means cooperative with the first linkage subassembly for positioning of the trailing edge portion of the flap panel relative to the middle portion so as to position the panel in predetermined angular orientations in its operative positions, and (2) means for positioning the trailing edge portion of the flap panel relative to the leading edge of the airfoil in the first operative position, so as to form an aerodynamic slot therewith, and for then retracting the trailing edge of the flap rearwardly to the leading edge of the airfoil in the second operative position, so as to form an aerodynamic seal therewith.

The means for extending the flap panel from its stowed position may comprise a connecting link having a forward end pivotally mounted to the middle portion of the flap chord beam, a first support arm having an upper end pivotally mounted to the fixed structure of the airfoil and a lower portion which is pivotally mounted to the rearward end of the connecting link, and a drive link which is pivotally mounted to a middle portion of the support arm and extends rearwardly therefrom to a rearward end which is mounted to the first pivot connection on the drive arm, so that rotation of the drive arm extends the drive link forwardly, which extends the lower end of the support arm and the connecting link which is mounted thereto, and this extends the flap panel in the downward and forward direction.

The means for positioning the trailing edge portion of the flap panel so that the Panel is positioned in its predetermined angular orientations may comprise a beam having a forward end pivotally mounted to the trailing edge portion of the flap panel, and a support arm having an upper end pivotally mounted to the airfoil and a lower end which is pivotally mounted to a middle portion of the support beam. The rearward end of the support beam is pivotally mounted to the second pivot connection on the drive arm, so that rotation of the drive arm extends the support beam, and this cooperates with the connecting link which is connected to the middle portion of the chord beam so as to position the panel in the predetermined angular orientations.

The means for positioning the trailing edge portion of the panel relative to the leading edge of the airfoil may comprise the above-mentioned support beam, second support arm, and drive arm, the drive arm being configured so that its second pivot connection is in a forwardly extended location when the drive arm is rotated to a first angular position, in which the linkage subassemblies position the flap panel in its first operative position, so that the support beam which is mounted to this pivot connection extends the trailing edge of the panel forwardly away from the leading edge of the airfoil so as to form an aerodynamic slot therewith. Further rotation of the drive arm to a second angular position, in which the linkage subassemblies position the flap panel in its second operative position, rotates the pivot connection to a rearwardly retracted position, so that the support beam retracts the trailing edge of the flap panel rearwardly to the leading edge of the airfoil so as to form an aerodynamic seal therewith.

The means for rotating the bullnose member outwardly about the forward end of the chord beam may comprise a link having a forward end which is pivotally mounted to the bullnose on the opposite side of the chord beam from the leading edge of the flap panel. The rearward end of this link is operatively connected to the forward end of the connecting link (at the middle portion of the chordwise beam) so that as the latter pivots when the flap panel is being extended, the bullnose deployment link is extended therefrom towards the bullnose, causing the bullnose to pivot about the end of the chord beam so as to reshorten the distance between the leading and trailing edges of the flexible flap panel.

These and other features and advantages of the present invention will be more clearly understood from the following description when read with reference to the accompanying drawings.

BRIEF DESCRIPTION OF THE DRAWINGS

FIG. 11 is a view similar to FIGS. 8-10, showing the flap extended to the first deployed position;

FIG. 12 is a view similar to FIGS. 8-11, showing the flap extended to the second deployed position;

FIG. 13 is an underside plan view of the flap assembly of FIGS. 4-12, showing the two sets of generally parallel cooperative linkage subassemblies which deploy the flap panel; and FIG. 14 is a view similar to FIGS. 8-12, showing the sequential positions of the flap during its deployment, using a series of phantomline images.

DETAILED DESCRIPTION

Figure 1:
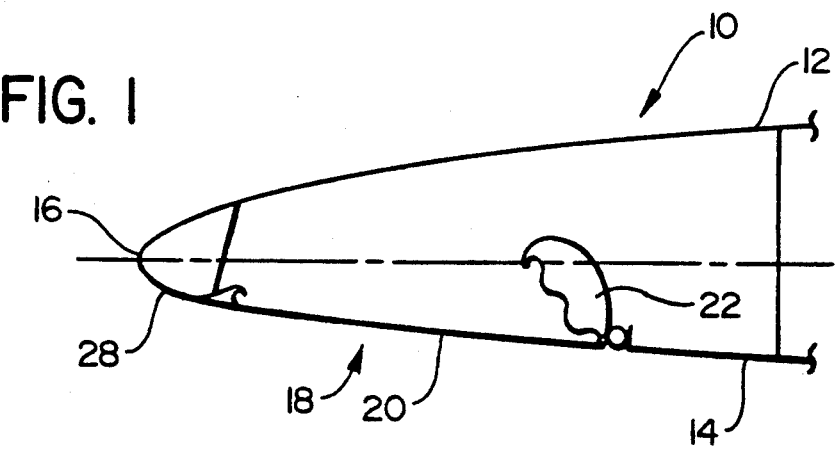
FIG. 1 is a chordwise cross-sectional view of a leading edge flap incorporating the present invention, this being in the stowed position whereat it completes the undersurface contour of the airfoil.
Figure 2:
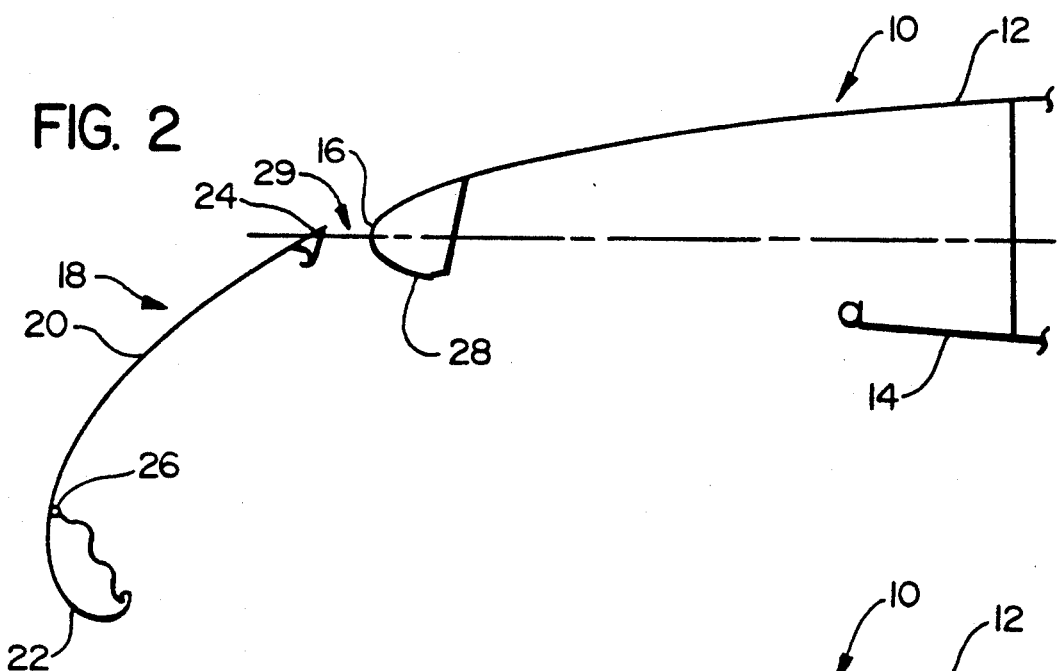
FIG. 2 is a view similar to FIG. 1, showing the leading edge flap extended to its first forward operating position, whereat the flap is spaced from the leading edge of the wing so as to form a slot therewith.
Figure 3:
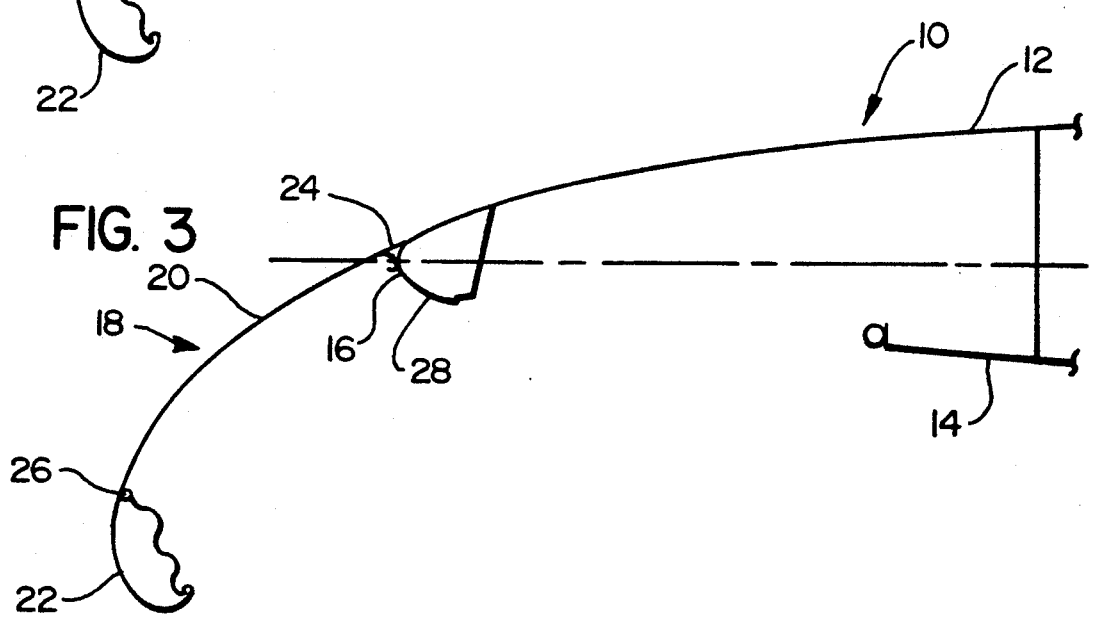
FIG. 3 is a view similar to FIGS. 1-2, showing the leading edge flap deployed to its second forward operating position, whereat the rear edge of the flap is aerodynamically sealed with respect to the leading edge of the wing.

It is believed that a clearer understanding of the present invention will be obtained by first making reference to FIGS. 1-3, and describing with respect thereto the operation of the main aerodynamic components of the flap apparatus. After that, reference will be made to the remaining figures of the drawings, and the operating linkage and the remainder of the present invention will be described in more detail.

FIGS. 1-3 show the outline of the forward portion of an airfoil, which in this embodiment is a main wing 10 of an airplane. This wing 10 has an upper surface 12, a lower surface 14, and a leading edge 16. The flap assembly of the present invention is generally designated 18, and for purposes of clarity, only a portion of flap assembly is illustrated in FIGS. 1-3. The two main aerodynamic components of flap assembly 18 are a flexible flap panel 20 and a bullnose member 22. The panel 20 has a trailing edge 24, and a leading edge 26 at which the bullnose member 22 is hinge connected. As shown in FIGS. 1-3, this flap assembly is deployed to three discreet positions, and the linkage and actuating mechanisms for doing this will be described later herein.

In FIG. 1, the flap assembly 18 is shown in its stowed condition. The flap panel 20 is positioned immediately rearwardly of the leading edge 16 of the wing, and is aerodynamically aligned with a lower surface portion 28 thereof, and is also aligned with the main aerodynamic lower surface 14 of the wing 10. In this stowed position, the panel 20 is substantially planar, with very little, if any, curvature. When it moves towards its deployed position, the flap assembly 18 travels from this stowed position downwardly and forwardly, and the camber (i.e., the curvature) of the flexible flap panel 20 changes; also, the bullnose 22 begins to rotate about the hinge connection 26 towards its deployed position.

FIG. 2 shows the flap assembly 18 positioned in its first high-lift Position, this being for use during landing operations, where the panel 20 has been flexed into a cambered configuration. The hinged bullnose member 22 extends downwardly from the front surface of panel 20 and is aerodynamically aligned therewith in an optimized configuration. In this first deployed position, the flap panel assembly 18 is positioned in a relatively steeply angled orientation relative to the airflow, and also, the trailing edge 24 of the panel section 20 is positioned a moderate, but significant, distance forwardly from the leading edge 16 of the wing so as to define a slot 29. As is known to those skilled in the art, this slot 29 is crucial in increasing the lift generated by the wing of the airplane during low speed landing operations.

FIG. 3 shows the flap assembly 18 having been moved to its second deployed position, this being an optimized configuration for use during take-off operations. In the take-off position of FIG. 3, the trailing edge 24 of the panel 20 has been moved rearwardly so as to be positioned against a forward portion of the main airfoil 10, just above the leading edge 16, Which eliminates slot 29 and forms an aerodynamic seal with the fixed wing structure. Although the camber of the panel 20 and the position of the bullnose member 22 relative to panel 20 may remain little changed from the landing configuration shown in FIG. 2, the flap itself is positioned in a somewhat shallower angular orientation relative to the airflow, so as to provide an optimized, low drag configuration for take-off.

At this point, it should be noted that the terms "forward", "rearward", "upper", "lower", and so forth, as used in this description and the appended claims, refer to directions and the relationships of the components of the flap assembly as these are in the deployed, operative positions shown in FIGS. 2 and 3.

We will now describe the linkage assembly 30 for deploying flap assembly 18 in the manner shown in FIGS. 1-3, and reference is initially made to FIGS. 4-7, which show the first of two linkage subassemblies which make up linkage assembly 30. More specifically, FIGS. 4-7 show only the first linkage subassembly 32 which, in addition to supporting the middle portion of the flap assembly as it is moved outwardly and forwardly from its stowed position, is primarily responsible for controlling the camber of the flap panel 20 and the rotational movement of the bullnose 22 as flap assembly 18 moves between its various positions. After this explanation is completed, the second sub-linkage making up linkage assembly 30 will be described with reference to FIG. 8-11.

Figure 4:
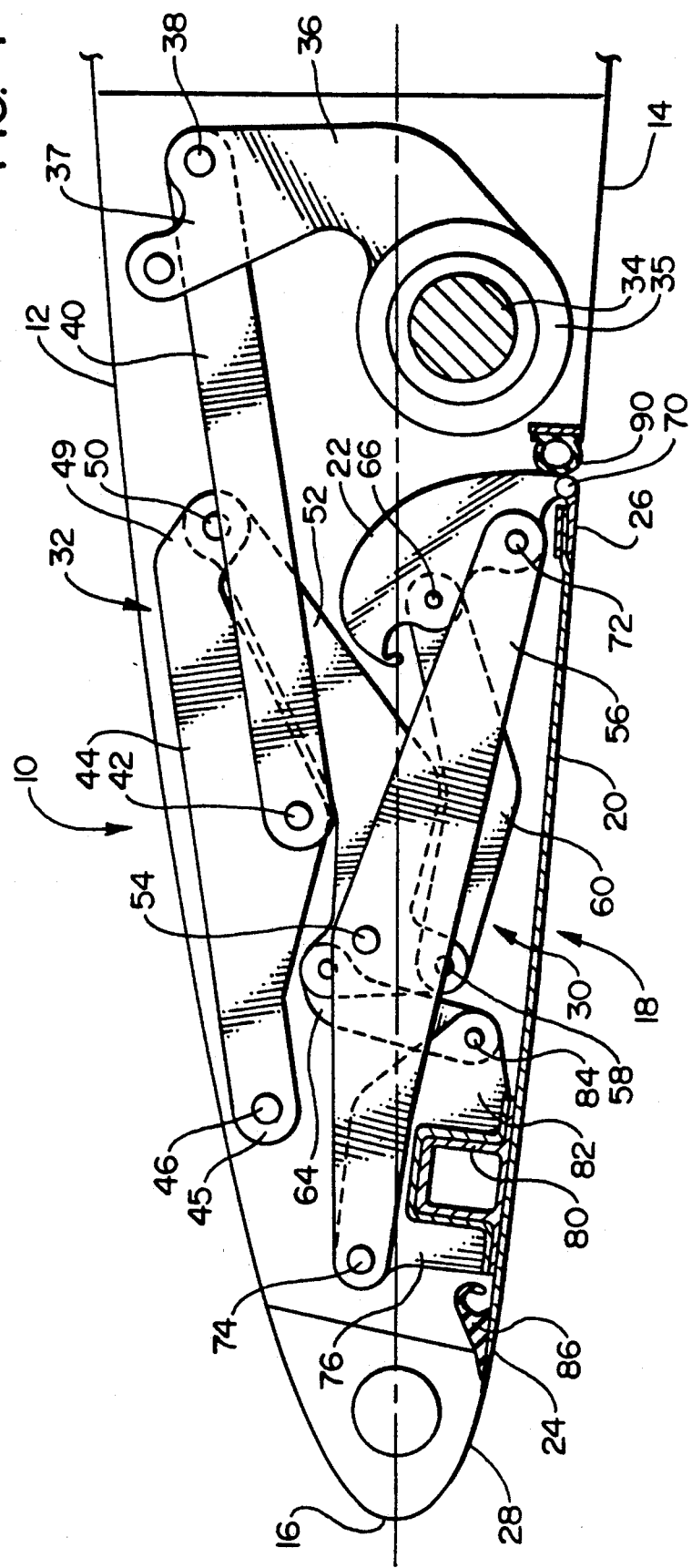
FIG. 4 is a cross-sectional view of the leading edge flap assembly in the stowed position, showing details of the flap and its operating linkage.

FIG. 4 shows flap assembly 18 in its stowed position, with the flexible flap panel 20 being in its generally planar configuration and aligned so as to form a substantially continuous aerodynamic surface with the lower surface 14 of wing 10. Because the linkage members are contracted to their most compact arrangement in order to be stowed within the airfoil, it is difficult to pick out the individual components of linkage subassembly 32 in FIG. 4, and so it is suggested that the reader view FIG. 5, which shows the main components more clearly.

Figure 5:
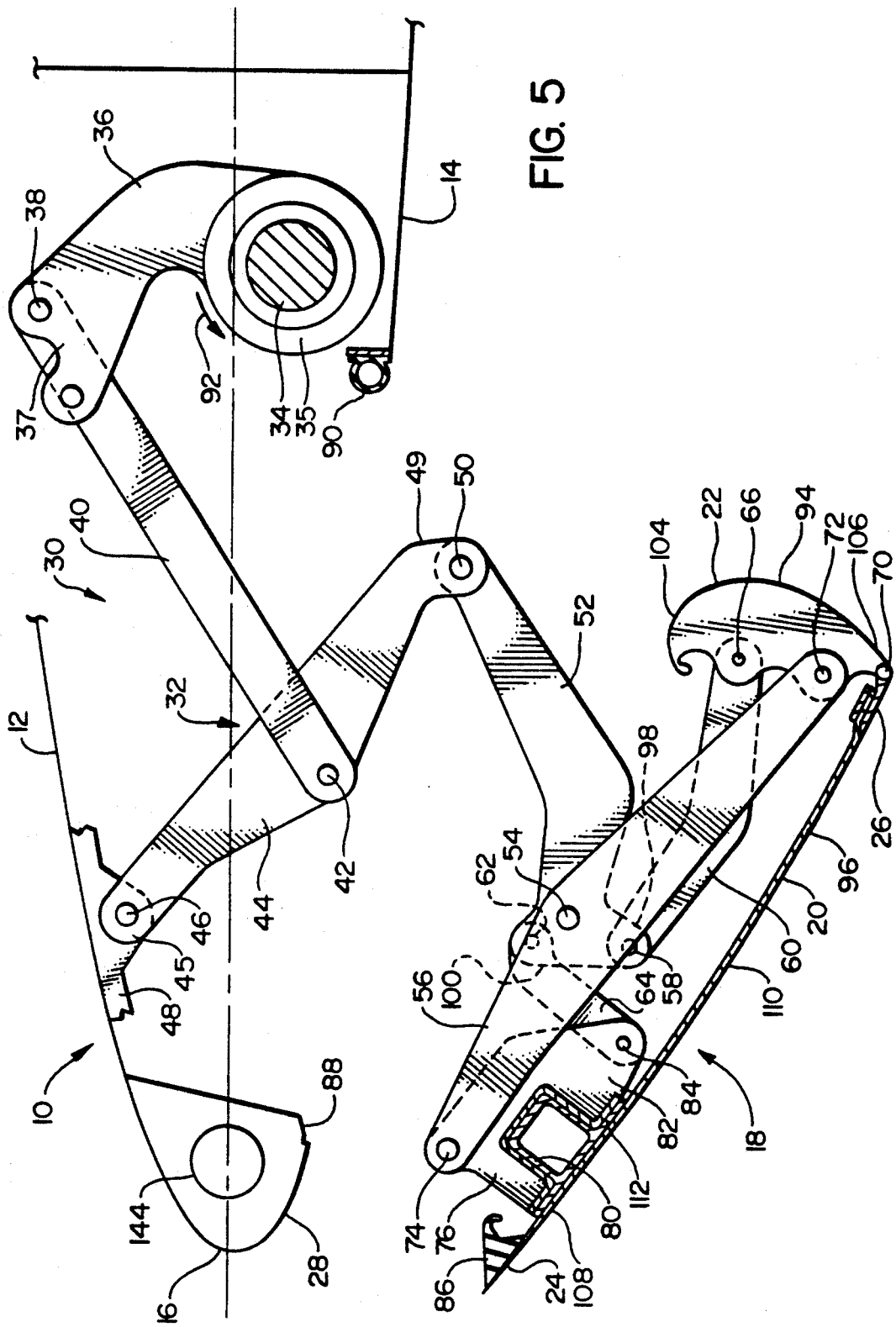
FIG. 5 is a view similar to FIG. 4, showing the flap partially deployed, in a position intermediate the stowed Position and the first deployed position.
Figure 6:
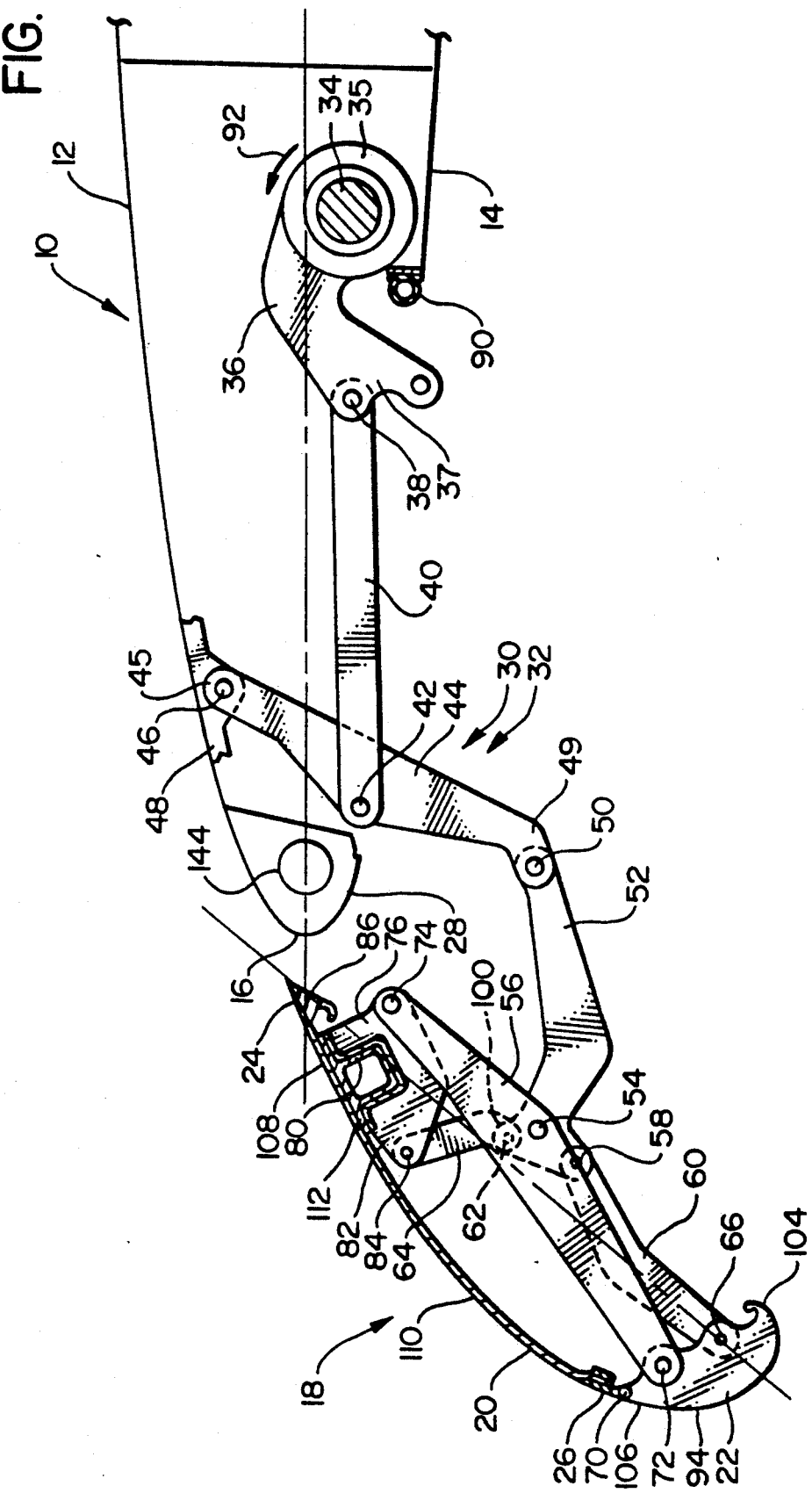
FIG. 6 is a view similar to FIGS. 4-5, showing the flap extended to the first deployed position.

FIG. 5 shows flap assembly 18 partially extended from the stowed position to its first deployed position power is supplied to the linkage 30 by a rotatably mounted drive shaft 34 which extends in a spanwise direction, this having a torque sleeve 35 mounted thereto. First and second parallel drive arms 36, 36' (36 only being shown in FIGS. 4-7) extend generally radially from torque sleeve 35. Each of these drive arms 36, 36' is attached to a mirror-image identical half of linkage 30, so, for purposes of clarity, only the half which is connected to drive arm 36 (which is pictured nearer the viewer) will be described herein with reference to FIGS. 4-12. Drive arm 36 has a Y-shaped outer end 37; a first pivot connection 38 on the rearward lobe is connected to the rearward end of an upper connecting link 40, the forward end of this being connected to pivot pin 42 at approximately the mid-length point of a first vertically extending support arm 44. This first support arm 44 has an upper end 45 which is connected, at upper pivot pin 46, to a fixed structure, such as a rib, in the forward portion of wing 10 (a portion of this fixed structure being indicated at 48), so that support arm 44 can swing back and forth from this. The lower end 49 of support arm 44 is connected to the rearward end of a forwardly extending control link 52 at pivot pin 50.

Control link 52 has several functions in the deployment of flap assembly 18. Firstly, control link 52 cooperates with the second linkage subassembly (not shown in FIGS. 4-7, but shown in FIGS. 8-11) to move the flap panel 20 and the bullnose 22 to the deployed positions of FIGS. 2 and 3 (these positions also being shown in FIGS. 6 and 7). Secondly, it cooperates with other components of the first linkage subassembly to rotate the bullnose member 22 towards its deployed position as shown in FIGS. 2 and 3). Thirdly, control link 52 cooperates with other components of first linkage subassembly 32 impose the proper camber on the flexible flap panel 20 as this moves to its deployed position.

The forward end of control link 52 has three pivot pin connections. The first, at pivot pin 54, connects control link 52 to the middle portion of a chordwise extending, fixed-length flap panel control beam 56. The forward end of control link 52 is Y-shaped, and a second pivot pin 58 connects the forward lobe to one end of a bullnose deploying link 60. A third pivot pin connection 62 connects the other, rearward lobe to one end of an upper panel angular positioning link 64. As will be described more fully hereinafter, the rotation of the forward end of control link 52 about pivot pin 54 operates links 60 and 64, not only to rotate the bullnose member 22 to its deployed position, but also to effect two other motions to change the camber of the flexible panel 20.

The forward end of the bullnose deploying link 60 is pivotally connected to bullnose member 22 at pivot pin 66, this being positioned relatively near the leading edge of bullnose member 22, away from the hinge 70 which joins the bullnose to the flap panel. A second pivot pin 72 is positioned closer to the hinge (i.e., in a chordwise position between pivot pin 66 and hinge 70), and this connects the forward end of the fixed-length panel control beam 56 to the bullnose member. The other end of this beam is connected at pivot pin 74 to a rearward portion of an attachment fitting 76; this, in turn, is mounted to a spanwise extending beam 80 which is mounted to the trailing edge portion of flexible flap panel 20. The bracket-like attachment fitting fits over beam 80, and has a forwardly projecting ear 82, at which the forward end of positioning link 64 is connected by pivot pin 84.

FIG. 5 also shows a wedge-shaped sealing strip 86 on the inner surface of the flap panel 20, at the trailing edge thereof; this is received in a corresponding recess 88 in the lower surface portion 28 of the leading edge of the wing so as to form a seal therewith. Similarly, there is a tubular sealing strip 90 at the rear edge of the opening in surface 14, and this abuts the retracted bullnose member so as to form a seal.

At this point, it bears repeating that the linkage subassembly 32 shown in FIGS. 4–7 is only a portion of the complete linkage assembly 30, and there is an additional linkage subassembly (which will be described with reference to FIG. 8–11) which cooperates in the proper deployment of the flap panel 20. More specifically, as will described later herein, this additional linkage shares the pivot connection 74 at the rearward end of the flap panel control beam 56, so that this additional linkage subassembly serves to properly locate the rearward portion of beam 56 and the trailing edge of flap panel 20 during deployment.

As previously noted, the first function of control link 52 is to move flap panel 20 to its deployed positions. In this function, control link 52 acts as one part of a four-bar linkage which is made up of drive arm 36, connecting link 40, support arm 44, and control link 52: as drive shaft 34 and torque sleeve 35 are rotated in the direction indicated by arrow 92, this motion is transmitted through the four-bar linkage to the centrally located pivot pin 54 so as to drive the flap panel 20 in an arc downwardly out of its stowed position and then forwardly towards its deployed positions. As this is done, the second linkage subassembly controls the motion of the trailing edge portion of the flap panel so as to insure the correct positioning and angular alignment of the flap panel, as will be described below.

As flap panel 20 is being deployed, control link 52 simultaneously performs its second function of rotating the bullnose member 22 to its properly deployed position. During deployment, the Y-shaped forward end of control link 52 rotates on pin 54 relative to control beam 56, in the stowed position (FIG. 4), the pivot pin 58 connecting the forward lobe 98 to bullnose deploying link 60 is rotated rearwardly to a position generally between pivot pin 54 and panel 20, so that the link 60 which is connected thereto is also retracted rearwardly; then, the rotation of link 52 about pivot pin 54 during the deployment of the flap assembly drives the bullnose deploying link 60 forwardly so that the bullnose member rotates outwardly about pivot pin 72 to its deployed positions (see FIGS. 6 and 7). In other words, as arm 52 rotates, the distance from connection 54 to connection 66 increases, while the distance from connection 54 to connection 72 remains constant, which causes the bullnose member to rotate about pivot connection 72 and into its deployed configuration. As previously noted, the trailing edge of the bullnose member is pivotally connected to the flap panel by a hinge connection 70; this may be a piano-type hinge, which provides a smooth, aerodynamically continuous joint between the outer surfaces of the bullnose member and the flap panel, and also provides the joint with enhanced stability in operation, although hinge 70 may of course be some other suitable mechanical or elastomeric hinge or the like.

The third function of control link 52 is that it cooperates with other linkage components to impose the proper camber on panel 20. In this regard, it will be understood that as bullnose deploying link 60 is driven forwardly in the manner previously described, so that the bullnose member pivots about pivot pin 72, the leading edge 104 of the bullnose moves generally forwardly while the trailing edge 106 moves generally rearwardly. This rearward motion of the trailing edge of the bullnose displaces the leading edge of the flap panel in a rearward direction; however, the trailing edge portion 108 of the flap panel is fixedly mounted (via beam 80 and attachment fitting 76 to the rearward end of fixed length beam 56. Accordingly, as the leading edge of the flap panel is forced rearwardly, the rearward edge is held against such movement, with the result that the central portion 110 of flap panel 20 bows outwardly to increase the camber of the panel. This increase can be seen in FIGS. 6 and 7.

So as to help insure that the proper camber is achieved, without over-reliance on the memory of the panel material, and so as to help insure the stability of the camber when subjected to aerodynamic forces, linkage subassembly 32 positively positions the trailing edge portion of the flap panel in angular alignment with the curved central portion. This is accomplished by means of positioning link 64, which, as was described above, is connected to the rearward lobe 100 of the end of control link 52, the other end of link 64 being connected to the forwardly extending ear 82 of attachment fitting 76. At the beginning of deployment, lobe 100 is rotated away from the inner surface of flap panel 20 (see FIG. 5), so that link 64 is retracted or withdrawn away from panel 20. This, in turn, draws the forward ear portion 82 of the attachment fitting towards panel control beam 56, causing the attachment fitting to rotate inwardly about pivot pin 74 and aligning the trailing edge portion 108 of the flap panel in a more horizontal orientation, so that this portion of the panel (as well as the remainder thereof) conforms aerodynamically to the lower surface 14 of wing 10. Then, as flap assembly 18 is deployed, the bifurcated end of control link 52 rotates about pivot pin 54 in the manner previously described, driving pivot pin 62 and positioning link 64 towards flap panel 20. This, in turn, forces the forwardly projecting ear of the attachment fitting in this direction, causing the attachment fitting and its associated beam 80 to rotate outwardly about the pivot pin 74 at the rearward end of panel control beam 56. This rotates the trailing edge portion 108 of the flap panel into angular alignment with the curved, highly cambered middle portion 110. Because beam 80 and its associated mounting flange 112 extend in a spanwise direction across the width of the flap panel, this provides for a very stable angular positioning of the trailing edge portion, which insures stability of the camber when the panel is subjected to aerodynamic forces. At the other, (i.e. the leading) edge of the flap panel, this stability is aided by the spanwise extending hinge 70 which connects the leading edge of the panel to the bullnose, while stability of the bullnose itself is insured by the two-point support provided by beam 56 and link 60.

Figure 7:
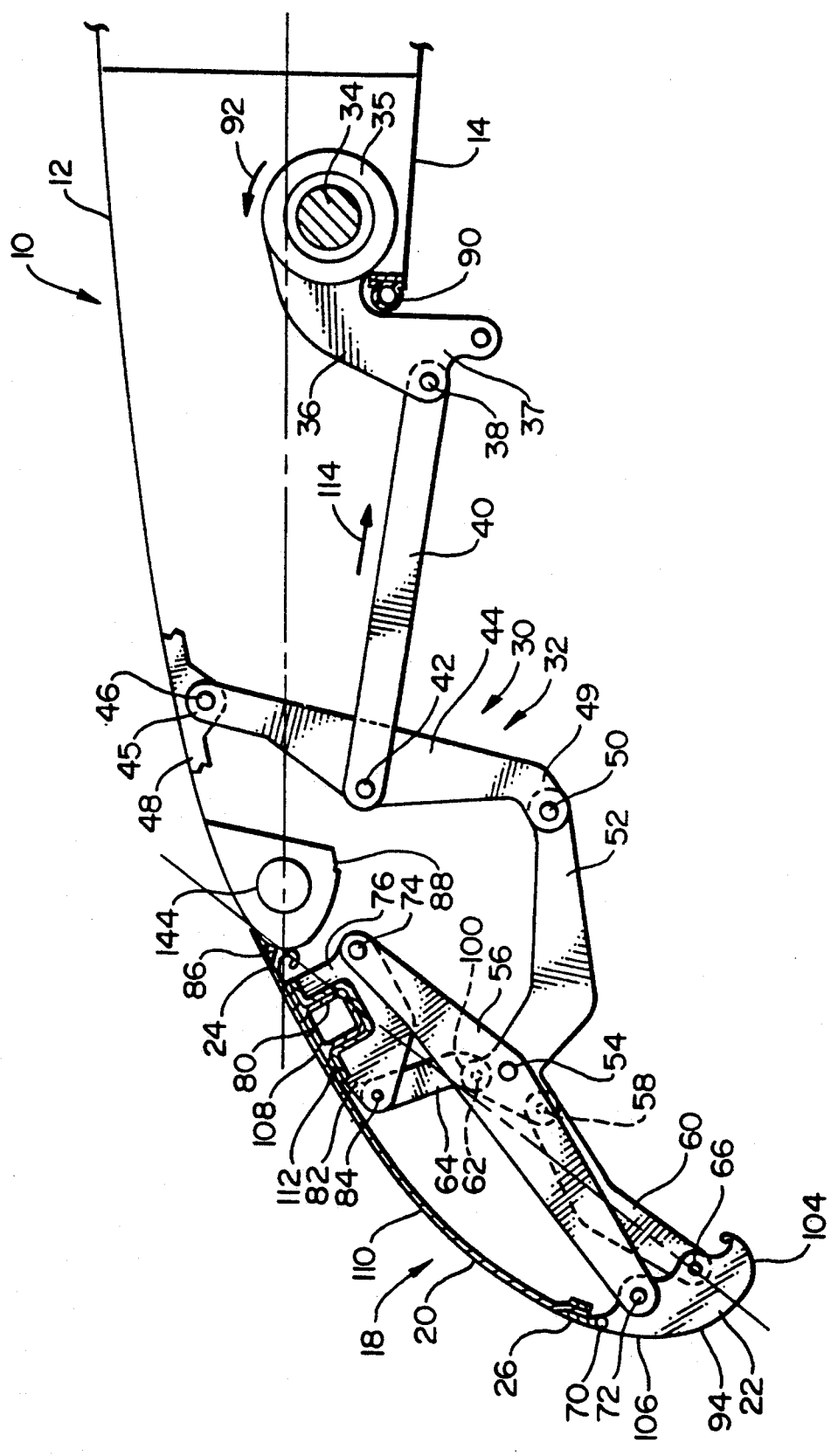
FIG. 7 is a view similar to FIGS. 4-6, showing the flap extended to the second deployed position.
Figure 8:
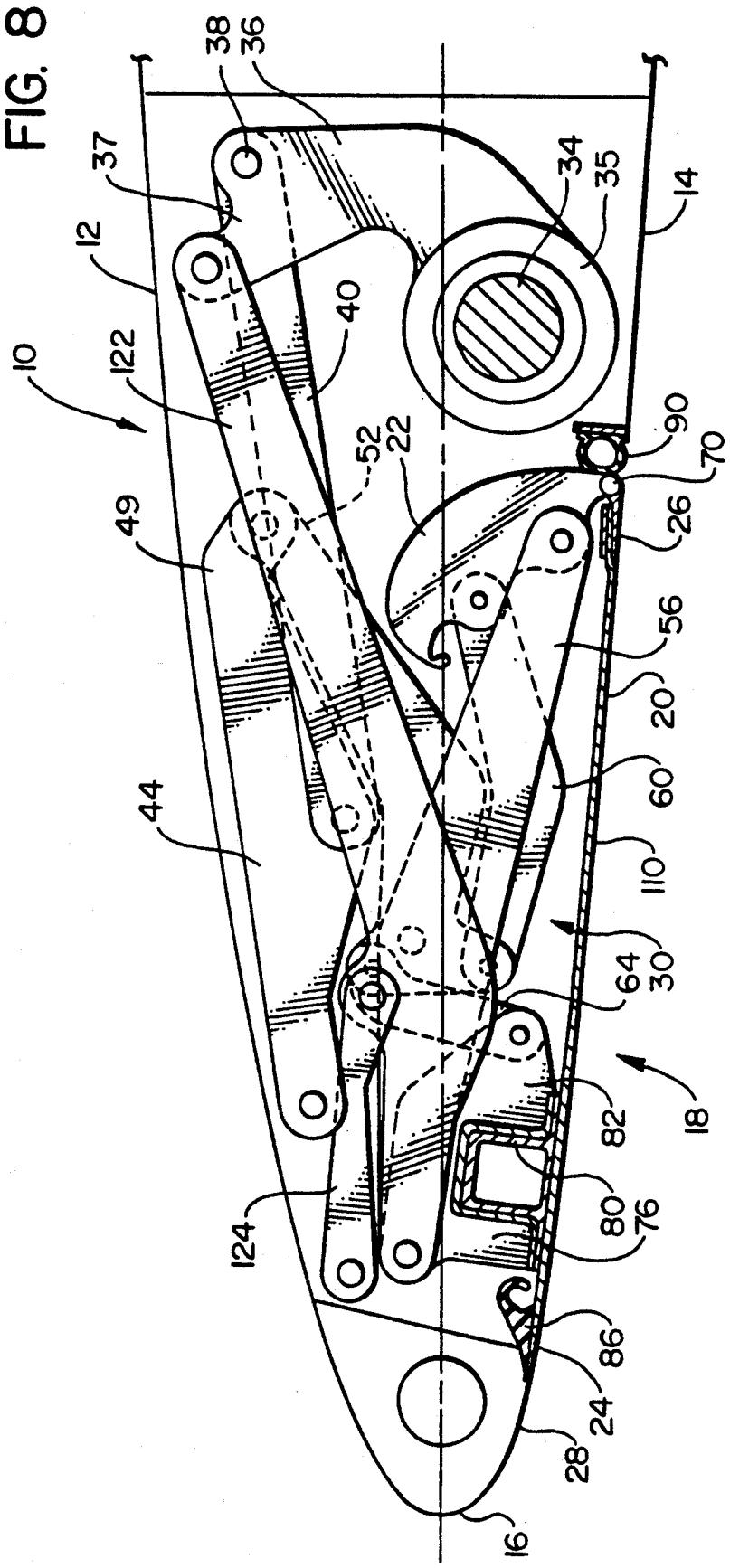
FIG. 8 is a chordwise cross-sectional view generally similar to FIG. 4, showing the flap in the stowed position, and showing additional details of the cooperative linkage subassemblies which deploy the flap.

As shown in FIG 7, further rotation of drive shaft 34 in the direction indicated by arrow 92 brings the flap panel assembly 18 to its second deployed position, in which it is configured for aircraft take-off. Although the camber of the flexible flap panel 20 remains generally similar to that of the landing configuration, the panel assembly itself has been moved rearwardly so that the sealing strip 86 at its rearward edge abuts the fixed wing structure just above leading edge 16 so as to form an aerodynamic seal therewith. This rearward motion of the flap assembly is accomplished by the rotation of the pivot connection 38 on drive arm 36 past its forwardmost position and then rearwardly, so that the lower portions of support arm 44 are also drawn rearwardly. It can thus be seen in FIG. 7 that the pivot pin 50 at the lower end of support arm 44 has moved rearwardly from the position shown in FIG. 6. It will also be noted that the longitudinal centerline of connecting link 40 has been rotated past the rotational axis of drive shaft 34, so that aerodynamic forces acting on flap assembly 18, transmitted through connecting link 40 in the direction indicated by arrow 114, will not tend to inadvertently rotate drive shaft 34 and arm 36 away from the deployed position.

FIGS. 8-12 show the operation of the second linkage subassembly 118, and how this cooperates with the first linkage subassembly which has been described. As previously noted, a primary function of this second linkage subassembly is to properly position the trailing edge portion of flap assembly 18, thus insuring the proper angulation of the flap assembly as it is deployed. To proceed now to a description of the main components of linkage subassembly 118, it is suggested that the reader view FIG. 9, which shows the main components more clearly than in the stowed position of FIG. 8.

As before, power is supplied to linkage subassembly 118 from drive shaft 34. However, in this case the drive is taken from the forward lobe 119 of drive arm 36, this being connected by pivot pin 120 to the rearward end of an upper support beam 122. Beam 122 is supported from the fixed structure 48 of wing 10 an by upper support arm 124; the upper end of support arm 124 is connected to structure 48 by pivot pin 126, while the lower end of the support arm is connected to a middle portion of beam 122 by a second pivot pin 128. Beam 122 is consequently supported for forward and aft "swinging" movement as drive arm 36 is rotated by drive shaft 34. The forward end of beam 122 is connected to the rearward end of attachment fitting 76 by pivot pin 74, which it shares With the rearward end of the panel control beam 56. Thus, as flap assembly 18 is deployed, linkage subassembly 118 positions its rearward end at points about which the rest of flap panel assembly is pivoted to achieve the desired angular orientation. Because of the additional lever arm provided by support arm 44 in the first linkage subassembly 32, this moves the middle portion of flap assembly 18 (at pivot pin 54) forward a greater distance per a given amount of rotation of drive arm 36 than the distance by which pivot pin 74 is moved forward by second linkage subassembly 118. As a result, the forward and middle portions of flap assembly 18 pivot downwardly and then forwardly around pivot pin 74 as the assembly is deployed.

Figure 9:
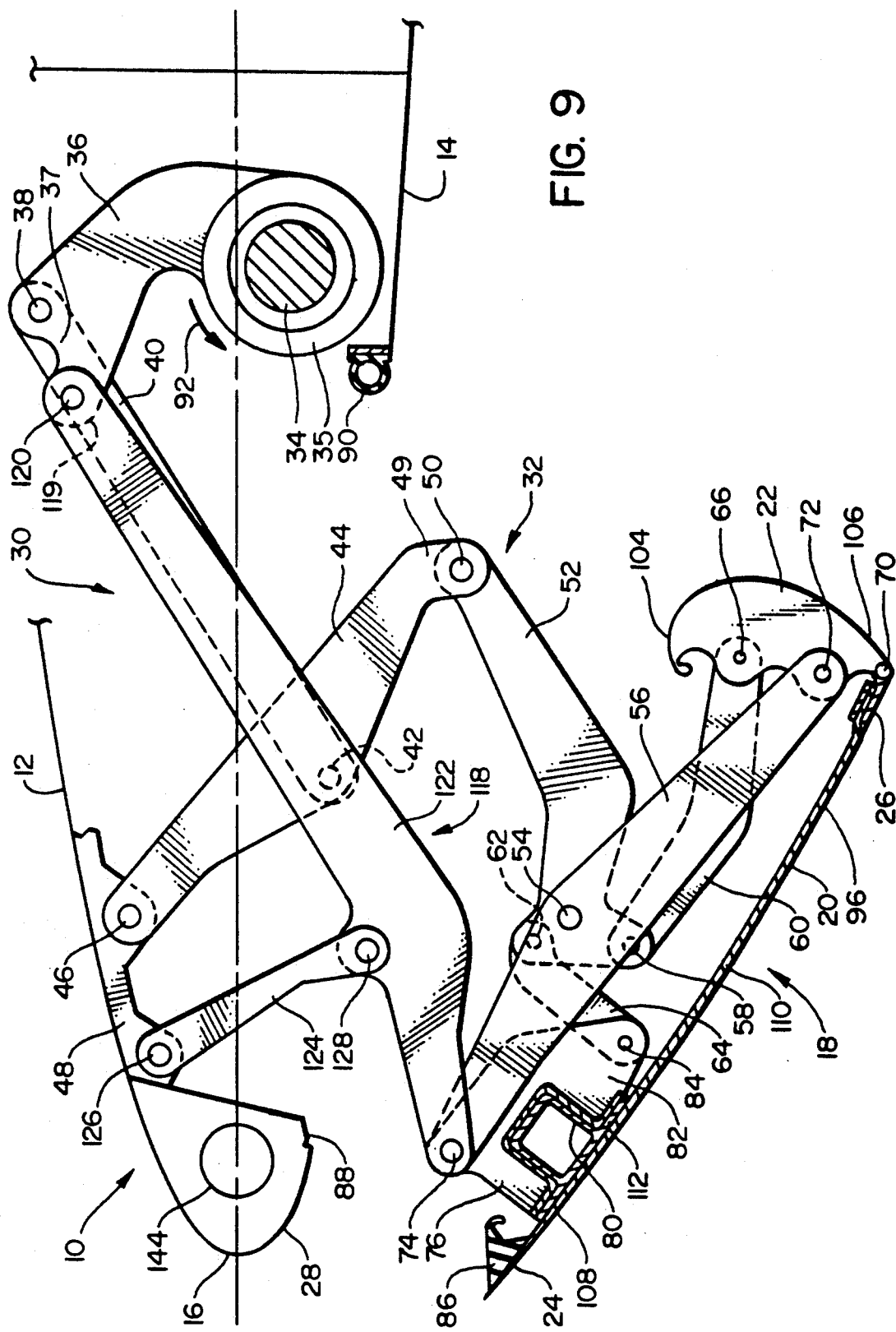
FIG. 9 is a view similar to FIG. 8, showing the flap partially deployed, in a position intermediate the stowed position and the first deployed position.
Figure 10:
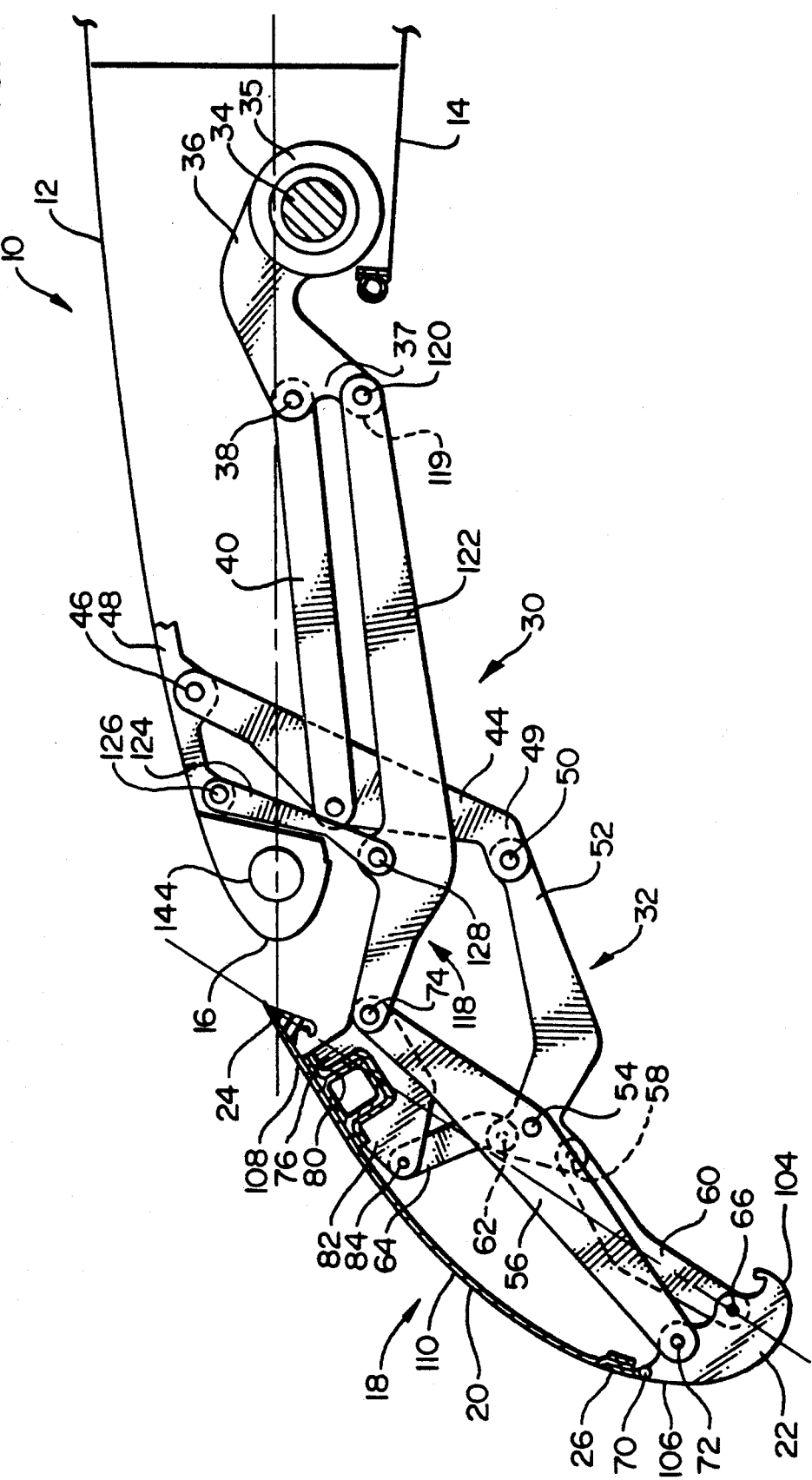
FIG. 10 is a view similar to FIGS. 8-9, showing the flap further extended to a second partially deployed position.

An important advantage of this arrangement is illustrated in FIG. 9. This shows flap assembly 18 during the initial stages of deployment, immediately after it has begun to move downwardly from the lower surface of wing 10. Because the flap assembly rotates downwardly and forwardly about pivot pin 74, at this point the leading edge 26 of flap panel 20 (which is towards the rear of the wing in this position) has extended downwardly further than the trailing edge portion 108. The inclined aerodynamic surface 96 of the flap panel thus avoids the "scoop" effect which occurs in some prior art devices at this point in the deployment. In other words, the angulation of the flap panel which is shown in FIG. 9 tends to force the flap assembly 18 towards the stowed position, and so guards against accidental self-deployment of the assembly due to aerodynamic forces.

Another, generally more significant advantage of using the two linkage subassemblies 32 and 118 described above is that this permits the assembly to use the simple rotational motion of driveshaft 34 to first position the flap in an ideal landing configuration, in which it is relatively steeply angled to the airflow and positioned relatively far forward of the fixed wing structure so as to form an aerodynamic slot therewith, and to then move the flap to a more shallowly angled orientation and rearwardly against the leading edge of the wing so as to form an aerodynamic seal therewith so as to achieve an ideal takeoff configuration. This is essentially because, unlike the previously proposed devices discussed above, the system of the present invention utilizes one linkage subassembly to provide the primary downward and forward movement of the flap assembly while a different subassembly attends to the control of the trailing edge portion of the flap so as to provide the desired angulation and the final rearward movement into abutment with the leading edge of the wing For instance, FIG. 12 shows panel assembly 18 in the shallowly angulated takeoff configuration, with its trailing edge forming the aerodynamic seal with the wing. To move the panel assembly to this position, the drive shaft 34 is rotated an additional amount in the directional indicated by arrow 92. This rotates the outer end of drive arm 36 past its most forwardly extended position, so that it begins to move rearwardly. As this is done, support beam 122 is drawn rearwardly, swinging movement in this direction being permitted by the pivoting upper support arm 124. Because beam 122 is connected to the leading lobe (in terms of direction of rotation) on drive arm 36, the rotation of drive shaft 34 from the position shown in FIG. 11 to the position shown in FIG. 12 draws beam 122 rearwardly by a greater amount than connecting link 40, which is connected to the trailing lobe of the drive arm. Consequently, not only does the trailing edge of the flap assembly move rearwardly towards the leading edge of the wing in response to this rotation of the drive shaft, but also, the greater rearward motion of second linkage subassembly 118 relative to first linkage subassembly 32 during this phase causes flap assembly 18 to pivot about pins 50 and 54 to the desired shallower angular orientation.

Another advantage provided by the linkage system of the present invention is that it overcomes the oversensitivity problems of some of the known systems discussed above. Because the motion of the flap assembly 18 from the first operative position shown in FIG. 11 to the second operative position shown in FIG. 12 results from the generally linear movements of the upper support beams of the second linkage subassembly, and the connecting and control links of the first linkage subassembly, this movement corresponds to a relatively greater amount of rotation of the drive shaft than is the case in several of the known systems discussed above (e g , Cole '870 Dean), where this movement is more directly subtended by the rotation of a bell crank. For instance, in an exemplary embodiment of the present invention, drive shaft 34 rotates approximately 126 degrees from the stowed position to the first deployed position shown in FIG. 11, and then rotates an additional 36 degrees beyond this to the second deployed position shown in FIG. 12 (for a total of 162 degrees of rotation). This relatively large amount of rotation between each of the three distinct positions of the flap assembly renders it much easier to control the system accurately.

FIG. 13 shows the various parallel links and other features of the first and second linkage subassemblies, all of which were not visible in the views of FIGS. 4–12. These include the first and second wing ribs 48, 48' (from which linkage 30 is hung), the first and second parallel connecting links 40, 40', and the parallel upper support beams 122, 122'. Also shown is the Y-shaped upper end of support arm 44, one fork of which is connected to the first rib 48 at pivot pin 46, and the second fork of which is connected to rib 48' at pivot pin 46'; the single lower end of support arm 44 is also shown, this being connected to control link 52 at pivot pin 50 in the manner previously described. The arms 124, 124' which supports beam 122 are also shown hung off the parallel ribs 48, 48'; in this case, these arms are joined together at their upper ends to form an inverted "U" or horseshoe-shaped structure, Which provides both greater strength and insures that these arms move in unison, and which also provides clearance for support arm 44 to pass between the lower ends of these two arms. The lower ends of support arms 124, 124' are forked to form clevises which are joined to beams 122, 122' by pivot pins 128, 128'.

FIG. 13 also shows the configuration of attachment fitting 76: this has two upstanding wall portions 132, 132', which are spread apart from one another at the rearward end of the fitting for attachment to the forward ends of the two parallel beams 122, 122,, and which then come close together at the forward end of the fitting for attachment to the single positioning link 64 at pivot pin 84 (not visible in FIG. 13, but shown in FIG. 12). Also, the two parallel panel control beams 56, 56' are connected by pivot pins 74, 74' to the two spread apart wall portions at the rear of attachment fitting 76, and extend forwardly therefrom to pivot connections 72, 72' on bullnose member 22, this having a rearwardly extending mounting lug 134 which fits between two forward ends of the control beams.

FIG. 14 shows flap panel 18 in a series of sequential positions 140a–140k, which represent the motion and orientation of the flap panel as it is deployed. This illustrates two important advantages of the flap assembly incorporating the present invention. First, throughout its deployment, the flap panel presents an aerodynamically continuous surface to the airstream (i.e., a surface which is generally free of discontinuities, as between the flap panel and the bullnose member), and this surface is also continuously angled so as to avoid any "scoop" effect which could cause accidental deployment of the assembly. Secondly, the flap panel first pivots in a downward and then forward direction to the first deployed position, and then moves generally straight back to the second deployed position, in which it forms the seal with the leading edge of the wing (see esp. 140k–140l). The ability of the linkage to provide these two distinct motions enables the flap assembly to be positioned in the ideal location, and in the ideal angular orientation, in each of its operative positions. This is to be contrasted with the arrangement taught, for example, in the Dean patent, where, rather than pivoting to the first position and then moving straight back to the rearward position, the flap pivots into both positions, so that in each of these the location and angular orientation of the flap must be compromised.

Yet another advantage of the present invention is that it does not interfere with the installation of de-icing ducting 144 within the interior of the leading edge of the wing structure. This is because the linkage 30 relies on the somewhat linear, "swinging" motion of the support beams 122 and control link 52 for operation, and so it is possible to hang the support arms 124 and 44 off of the wing rib structure 48 relatively far back from the leading edge of the wing, thus leaving room for the deicing duct.

Having described the invention in its preferred embodiments, it will be clear that modifications and changes may be made without departing from the spirit of the invention. It is therefore not intended that the words used to describe the invention or the drawings illustrating the same be limiting on the invention; rather, it is intended that the invention be limited only by the scope of the appended claims.

What is claimed is:

1. A linkage mechanism for extending a flap from a stowed position within the undersurface of an airfoil to a forward extended operative position, said linkage mechanism comprising:
   a first linkage subassembly comprising:
      a first drive arm portion mounted to fixed structure of said airfoil for rotation in a chordwise plane;
      a drive link having a rearward end mounted to said first drive arm portion and a forward end operatively connected to a middle portion of said flap, so that in response to rotation of said drive arm portion said drive link extends said flap downwardly and forwardly to said operative position; and
      a first support arm having an upper end pivotally mounted to fixed structure of said airfoil and a lower portion pivotally mounted to said drive link so as to support said drive link for extension relative to said airfoil; and
   a second linkage subassembly comprising:
      a second drive arm portion mounted for rotation coaxially with said first drive arm portion;
      a second drive link having a rearward end mounted to said second drive arm portion and a forward end pivotally connected to a trailing edge portion of said flap, so that in response to rotation of said second drive arm portion said second link extends said trailing edge portion of said flap to a predetermined position in said operative position; and
      a second support arm having an upper end pivotally mounted to fixed structure of said airfoil and a lower portion pivotally mounted to said second drive link so as to support said second drive link for extension relative to said airfoil.

2. The linkage mechanism of claim 1, wherein said first linkage subassembly further comprises:
   an end portion of said support arm which extends downwardly from said drive link which is pivotally mounted to said support arm; and
   a connecting link having a rearward end mounted to said end portion of said support arm and a forward end pivotally mounted to said middle portion of said flap.

3. The linkage mechanism of claim 2, further comprising:
a first link having an outer end connected to a leading edge portion of a flexible panel of said flap and extending rearwardly therefrom;
a second link having an outer end connected to a trailing edge portion of said flexible panel and extending forwardly therefrom; and
an inner end of said first link and an inner end of said second link being operatively connected to said forward end of said connecting link for foreshortening the distance between said outer ends of said first and second links so as to increase the camber of said flap as said flap panel is extended downwardly and forwardly by said connecting link.

4. The linkage mechanism of claim 2, further comprising:
a bullnose member pivotally mounted to a leading edge of a flexible panel of said flap for chordwise rotation;
a chordwise extending fixed length beam having a forward end pivotally mounted to said bullnose member adjacent to said leading edge of said panel, a rearward end pivotally mounted to a trailing edge portion of said panel, and a middle portion pivotally mounted to said forward end of said connecting link; and
a bullnose deployment link having a forward end pivotally connected to said bullnose member on a chordwise opposite side of said forward end of said beam from said leading edge of said panel, and a rearward end operatively connected to said forward end of said connecting link, so that as said forward end of said connecting link pivots relative to said beam as said flap is extended to said operative position, said bullnose deployment link is extended forwardly so that said bullnose member pivots about said forward end of said fixed length beam so as to foreshorten the distance between said leading and trailing edges of said flexible panel, so that a middle portion of said panel curves outwardly so as to increase the camber of said flap.

5. The linkage mechanism of claim 4, further comprising:
a rear panel control link having an outer end mounted to said trailing edge portion of said panel forwardly of said rearward end of said fixed length beam;
an inner end of said rear panel control link being operatively connected to said forward end of said connecting link, so that as said forward end of said connecting link pivots relative to said beam as said flap is extended to said operative position, said rear panel control link is extended outwardly so that said trailing edge portion of said flexible panel pivots about said rearward end of said fixed length beam so as to angularly align said trailing edge portion of said panel with said outwardly curved middle portion of said panel.

6. The linkage mechanism of claim 4, further comprising a spanwise extending piano-type hinge pivotally connecting said bullnose member to said leading edge of said panel.

7. The linkage mechanism of claim 1, wherein said second drive link is configured so that, in response to rotation of said second drive arm portion to a first angular position, said second drive link positions said trailing edge portion of said flap in a first predetermined location such that a trailing edge of said flap is spaced forwardly from a leading edge of said airfoil so as to form an aerodynamic slot therewith, and in response to rotation of said second drive arm portion to a second angular position, said second drive link draws said trailing edge portion of said flap rearwardly into a second predetermined location such that said trailing edge of said flap is positioned adjacent said leading edge of said airfoil so as to form an aerodynamic seal therewith.

8. A variable camber flap assembly having a linkage mechanism arranged and actuated in a chordwise plane for extending a flap to first and second forward operative positions from a stowed position within an undersurface of an airfoil, said flap assembly comprising:
a flexible flap panel having leading and trailing edges;
a bullnose member having a trailing edge which is mounted to said leading edge of said flap panel for chordwise rotation, said edges of said bullnose member and said flap panel being mounted together along a hinge joint which extends generally perpendicular to said chordwise plane so that a substantially continuous aerodynamic surface is formed by said member and said panel;
a flap chord beam having a first end pivotally mounted to said bullnose member and a second end mounted to a trailing edge portion of said flap panel;
a drive arm pivotally mounted to fixed structure of said airfoil for rotation in a chordwise plane, said drive arm having first and second angularly spaced apart pivot connections;
a first linkage subassembly operatively interconnecting said first pivot connection on said control arm with said flap panel, said first linkage subassembly comprising:
means for extending said flap panel in a downward and forward direction from said stowed position to said first and second operative positions; and
means for rotating said bullnose member outwardly about said first end of said chord beam as said flap panel extends from said stowed position to said first operative position, so that said trailing edge of said bullnose member and said leading edge of said flap panel which is mounted thereto at said hinge joint are pivoted toward said trailing edge of said panel, so as to foreshorten the distance between said edges of said flap so that said flexible flap panel curves outwardly to increase the camber of said flap; and
a second linkage subassembly operatively interconnecting said second pivot connection on said control arm with said flap panel, said second linkage subassembly comprising:
means cooperative with said first linkage subassembly for positioning said trailing edge portion of said flap panel relative to a middle portion of said flap panel so that said flap panel is positioned in a first predetermined angular orientation in said first operative position, and in a second predetermined angular orientation in said second operative position; and
means for positioning said trailing edge portion of said flap panel in a first predetermined location relative to a leading edge of said airfoil in said first operative position so as to form an aerodynamic slot therewith, and for retracting said trailing edge portion of said flap panel rearwardly to a second predetermined location relative to said leading edge of said airfoil in said second operative position so as to form an aerodynamic seal therewith.

9. The variable camber flap assembly of claim 8, wherein said means for extending said flap panel downwardly and forwardly from said stowed position to said first and second operative positions comprises:
- a connecting link having a forward end pivotally mounted to a middle portion of said flap chord beam and extending rearwardly therefrom;
- a first support arm having an upper end pivotally mounted to fixed structure of said airfoil and a lower end pivotally mounted to a rearward end of said first connecting link; and
- a drive link pivotally mounted to a middle portion of said first support arm and extending rearwardly therefrom;
- a rearward end of said drive link being pivotally mounted to said first pivot connection on said drive arm so that, in response to rotation of said drive arm in a selected direction, said drive link extends from said drive arm so that said connecting ink which is connected to said lower end of said support arm extends said flap panel in said downward and forward direction from said stowed position.

10. The variable camber flap assembly of claim 9, Wherein said means for positioning said trailing edge portion of said flap panel so that said flap panel is positioned in said predetermined angular orientations comprises:
- a support beam having a forward end pivotally mounted to said trailing edge portion of said flap panel and extending rearwardly therefrom; and
- a second support arm having an upper end pivotally mounted to fixed structure of said airfoil and a lower end pivotally mounted to a middle portion of said support beam;
- a rearward end of said support beam being pivotally mounted to said second pivot connection on said drive arm so that, in response to rotation of said drive arm in said selected direction, said support beam extends from said drive arm so that said forward end of said support beam which is mounted to said trailing edge portion of said flap panel cooperates with said forward end of said connecting link which is mounted to said middle portion of said panel chord beam so as to position said panel in said predetermined angular orientations as said panel is extended to said first and second operative positions.

11. The variable camber flap panel assembly of claim 10, wherein said means for positioning said trailing edge portion of said panel in said first and second locations relative to said leading edge of said airfoil comprises said support beam, said second support arm, and said drive arm, said drive arm being configured so that said second pivot connection is positioned in a forwardly extended location when said drive ar is in a first angular position in which said linkage subassemblies position said flap in said first operative position, so that said support beam which is connected to said forwardly extended pivot connection extends said trailing edge portion of said flap panel forwardly from said leading edge of said airfoil so as to form said aerodynamic slot, and so that rotation of said drive arm in said selected direction from said first angular position to a second angular position, in which said linkage subassemblies position said flap panel in said second operative Position, rotates said second pivot connection to a rearwardly retracted position, so that said support beam which is mounted to said retracted pivot connection retracts said trailing edge portion of said flap panel rearwardly into proximity with said leading edge of said airfoil so as to form said aerodynamic seal.

12. The variable camber flap assembly of claim 11, wherein said means for rotating said bullnose member about said forward end of said panel chord beam comprises a bullnose deployment link having a forward end pivotally mounted to said bullnose member on a chordwise opposite side of said forward end of said chord beam from said leading edge of said flap panel, and a rearward end operatively connected to said forward end of said connecting link so that as said forward end of said connecting link pivots relative to said chord beam as said flap panel is extended towards said operative positions, said deployment link is extended towards said bullnose member so that said member pivots outwardly about said forward end of said chord beam so as to foreshorten said distance between said leading edge and trailing edge portion of said flexible panel.

13. The variable camber flap assembly of claim 12, wherein said first linkage subassembly further comprises means for selectively angulating said trailing edge portion of said panel so that said trailing edge portion of said panel is aligned with the curvature of said panel having increased camber in said first and second operative positions.

14. The variable camber flap assembly of claim 13, wherein said means for angulating said trailing edge portion of said panel comprises:
- a rear panel control link having a first end mounted to said trailing edge portion of said flap panel forwardly of said second end of said flap chord beam;
- a second end of said rear panel control link being operatively connected to said forward end of said connecting link so that, as said forward end of said connecting link pivots relative to said chord beam as said flap is extended towards said operative positions, said control link is extended towards said trailing edge portion of said flexible panel so that said trailing edge portion pivots about said second end of said chord beam into alignment with said curvature of said panel.

* * * * *